(12) United States Patent
Burgess et al.

(10) Patent No.: US 10,029,175 B2
(45) Date of Patent: Jul. 24, 2018

(54) CONTROLLER FOR A GAMES CONSOLE

(71) Applicant: Ironburg Inventions Ltd., Wincanton, Somerset (GB)

(72) Inventors: Simon Burgess, Cossington (GB); Duncan Ironmonger, Atlanta, GA (US)

(73) Assignee: Ironburg Inventions Ltd., Wincanton (GB)

( * ) Notice: Subject to any disclaimer, the term of this patent is extended or adjusted under 35 U.S.C. 154(b) by 0 days.

(21) Appl. No.: 15/039,984

(22) PCT Filed: Nov. 27, 2014

(86) PCT No.: PCT/EP2014/075851
§ 371 (c)(1),
(2) Date: May 27, 2016

(87) PCT Pub. No.: WO2015/078987
PCT Pub. Date: Jun. 4, 2015

(65) Prior Publication Data
US 2017/0001107 A1  Jan. 5, 2017

Related U.S. Application Data

(60) Provisional application No. 61/910,168, filed on Nov. 29, 2013.

(51) Int. Cl.
*A63F 13/24* (2014.01)
*A63F 13/22* (2014.01)

(52) U.S. Cl.
CPC .............. *A63F 13/24* (2014.09); *A63F 13/22* (2014.09)

(58) Field of Classification Search
CPC ...................................................... A63F 13/12
See application file for complete search history.

(56) References Cited

U.S. PATENT DOCUMENTS

| | | | |
|---|---|---|---|
| 4,032,728 | A | 6/1977 | Oelsch |
| 5,430,262 | A | 7/1995 | Matsui et al. |
| 5,451,053 | A | 9/1995 | Garrido |
| 5,773,769 | A | 6/1998 | Raymond |
| 5,841,372 | A | 11/1998 | Matsumoto |
| 5,874,906 | A | 2/1999 | Willner et al. |

(Continued)

FOREIGN PATENT DOCUMENTS

| | | |
|---|---|---|
| EP | 1852162 | 11/2007 |
| EP | 2 479 636 | 7/2012 |

(Continued)

OTHER PUBLICATIONS

International Search Report, PCT/EP2014/075851 (dated 2015).

(Continued)

*Primary Examiner* — Omkar Deodhar
(74) *Attorney, Agent, or Firm* — Walters & Wasylyna LLC

(57) ABSTRACT

A hand held controller for a games console comprising an outer case and a plurality of controls located on a front end and top of the controller, the controller being shaped to be held in both hands of a user such that the user's thumbs are positioned to operate controls located on the top of the controller and the user's index fingers are positioned to operate controls located on the front of the controller. At least one control located on the top of the controller is configured for two-dimensional input control, the at least one control being substantially aligned with the biomechanics of the user's thumb.

24 Claims, 12 Drawing Sheets

(56) References Cited

U.S. PATENT DOCUMENTS

| | | | |
|---|---|---|---|
| 5,989,123 | A | 11/1999 | Tosaki et al. |
| 6,203,432 | B1 | 3/2001 | Roberts et al. |
| 6,251,015 | B1 | 6/2001 | Caprai |
| 6,512,511 | B2 | 1/2003 | Willner et al. |
| 6,752,719 | B2 | 6/2004 | Himoto et al. |
| 6,760,013 | B2 | 7/2004 | Willner et al. |
| 7,510,477 | B2 | 3/2009 | Argentar |
| 7,758,424 | B2 | 7/2010 | Riggs et al. |
| 7,859,514 | B1 | 12/2010 | Park |
| 8,641,525 | B2 | 2/2014 | Burgess et al. |
| 8,777,620 | B1 | 7/2014 | Baxter |
| 9,089,770 | B2 | 7/2015 | Burgess et al. |
| 9,804,691 | B1 | 10/2017 | Strahle et al. |
| 2001/0003713 | A1 | 6/2001 | Willner et al. |
| 2001/0025778 | A1 | 10/2001 | Ono |
| 2002/0052237 | A1 | 5/2002 | Magill |
| 2002/0128064 | A1 | 9/2002 | Sobota |
| 2003/0067111 | A1 | 4/2003 | Swan |
| 2004/0259059 | A1 | 12/2004 | Aoki |
| 2005/0083297 | A1 | 4/2005 | Duncan |
| 2005/0255915 | A1 | 11/2005 | Riggs et al. |
| 2005/0255918 | A1 | 11/2005 | Riggs et al. |
| 2006/0025217 | A1 | 2/2006 | Hussaini et al. |
| 2006/0116204 | A1 | 6/2006 | Chen et al. |
| 2008/0261695 | A1 | 10/2008 | Coe |
| 2009/0088250 | A1 | 4/2009 | Carlson |
| 2009/0258705 | A1 | 10/2009 | Guinchard |
| 2010/0073283 | A1 | 3/2010 | Enright |
| 2010/0267454 | A1 | 10/2010 | Navid |
| 2010/0304865 | A1 | 12/2010 | Picunko |
| 2011/0256930 | A1 | 10/2011 | Jaouen |
| 2011/0281649 | A1 | 11/2011 | Jaouen |
| 2012/0088582 | A1 | 4/2012 | Wu et al. |
| 2012/0142418 | A1 | 6/2012 | Muramatsu |
| 2012/0142419 | A1 | 6/2012 | Muramatsu |
| 2012/0299244 | A1 | 11/2012 | Rice et al. |
| 2012/0322553 | A1 | 12/2012 | Burgess et al. |
| 2012/0322555 | A1 | 12/2012 | Burgess et al. |
| 2013/0147610 | A1 | 6/2013 | Grant et al. |
| 2013/0150155 | A1 | 6/2013 | Barney et al. |
| 2013/0196770 | A1 | 8/2013 | Barney et al. |
| 2014/0274397 | A1 | 9/2014 | Sebastian |
| 2015/0234479 | A1 | 8/2015 | Schantz et al. |
| 2015/0238855 | A1 | 8/2015 | Uy et al. |
| 2016/0082349 | A1 | 3/2016 | Burgess et al. |
| 2016/0193529 | A1 | 7/2016 | Burgess et al. |
| 2016/0346682 | A1 | 12/2016 | Burgess et al. |
| 2017/0001107 | A1 | 1/2017 | Burgess et al. |
| 2017/0001108 | A1 | 1/2017 | Burgess et al. |
| 2017/0087456 | A1 | 3/2017 | Burgess et al. |
| 2017/0151494 | A1 | 6/2017 | Ironmonger et al. |
| 2017/0157509 | A1 | 6/2017 | Burgess et al. |

FOREIGN PATENT DOCUMENTS

| | | |
|---|---|---|
| EP | 2 698 185 | 2/2015 |
| GB | 2 244 546 | 12/1991 |
| GB | 2 481 633 | 1/2012 |
| JP | H1020951 | 1/1998 |
| WO | WO 03/046822 | 6/2003 |
| WO | WO 2008/131249 | 10/2008 |
| WO | WO2014/187923 | 11/2014 |
| WO | WO2015/004261 | 1/2015 |
| WO | WO2015/110553 | 7/2015 |

OTHER PUBLICATIONS

International Search Report, PCT/EP2014/075861 (dated 2015).
International Search Report, PCT/EP2014/060587 (dated 2014).
International Search Report, PCT/EP2015/058096 (dated 2015).
Written Opinion of the International Searching Authority, PCT/EP2015/058096 (dated 2015).
Burns, "Review: Scuf Xbox 360 Controller," Xboxer360.com (2010).
Combined Search and Examination Report, GB1011078.1 (dated 2011).
"Rapid Fire Mod for Wireless Xbox 360 Controller," forum on xbox-scene.com, (2008).
"Thrustmaster USB game controller roundup," dansdata.com/tmsticks.htm (2002).
Coles, Olin, "Thrustmaster Run-N-Drive PC/PS3 Wireless Gamepad" BenchmarkReviews.com (2009).
Office Action, U.S. Appl. No. 14/832,211 (dated 2015).
Office Action, U.S. Appl. No. 14/736,771 (dated 2015).
Office Action, U.S. Appl. No. 14/805,597 (dated 2015).
Office Action, U.S. Appl. No. 14/805,641 (dated 2015).
Corrected Petition for Inter Partes Review of U.S. Pat. No. 9,089,770, Under 37 C.F.R. § 42.100, filed by Valve Corporation, Case IPR2016-00949 (2016).
Corrected Petition for Inter Partes Review of U.S. Pat. No. 8,641,525, Under 37 C.F.R. § 42.100, filed by Valve Corporation, Case IPR2016-00948 (2016).
Xbox 360 Wireless Controller Tour, published on May 13, 2005 at http://www.ign.com/articles/2005/05/13/xbox-360-wireless-controller-tour.
European Patent Office, Communication pursuant to Article 94(3) EPC, Application. No. 14 803 143.8 (dated Jul. 25, 2017).

CONTROLLER FOR A GAMES CONSOLE

This application is a U.S. national phase application of Intl. App. No. PCT/EP2014/075851 filed on Nov. 27, 2014, which claims priority from U.S. Ser. No. 61/910,168 filed on Nov. 29, 2013. The entire contents of Intl. App. No. PCT/EP2014/075851 and U.S. Ser. No. 61/910,168 are incorporated herein by reference.

TECHNICAL FIELD

The present invention relates to games consoles, in particular to hand held controllers for games consoles.

BACKGROUND

Controllers for most current games consoles are generally intended to be held and operated by the user using both hands. A conventional controller will generally comprise a hard outer case with a plurality of controls mounted about the controller. Typically the controls include buttons, analogue control sticks, bumpers and triggers. An example of a conventional controller is shown in FIG. 1.

As can be seen in FIG. 1, controls are mounted on the front and top of the controller 1. Specifically, there are left and right analogue thumb sticks 2, 3 which normally control movement and are intended to be operated by the user's left and right thumbs respectively. There are four buttons 4, located on a front-right portion of the controller 1, which normally control additional actions and are intended to be operated by the user's right thumb. There is a direction pad 5 located on the lower portion of the front-left of the controller 1. The direction pad 5 is intended to be operated by the user's left thumb, typically either as an alternative to the left thumb stick 2 or to provide additional actions. There are a left trigger 6, a right trigger 7, a left bumper 8 and a right bumper 9 located on the front edge of the controller 1. The left and right triggers 6, 7 are typically operated by a user's index fingers. The left and right bumpers 8, 9 may also be operated by a user's index fingers.

The thumb sticks 2, 3 and the direction pad 5 each comprise directionality; that is to say, the controller is capable of determining the direction in which the thumb sticks 2, 3 or direction pad 5 are moved or pressed by a user. As shown, the right thumb stick 3 is configured such that a forward movement is achieved by moving the thumb stick towards the front of the controller, as indicated by direction arrow F; backward movement is achieved by moving the thumb stick towards the back of the controller, as indicated by direction arrow B; right and left movements are achieved by moving the thumb stick to the right or left respectively, as indicated by direction arrows R, L. The left thumb stick 2 and directional pad 5 are similarly configured.

It is an object of the disclosure to provide directional controls which are sympathetic to the biomechanics of a user's hand.

The present invention seeks to overcome or at least mitigate the problems of the prior art.

SUMMARY

According to a first aspect of the present invention there is provided a hand held controller for a games console comprising:
an outer case; and
a plurality of controls located on a front end and top of the controller;
the controller being shaped to be held in both hands of a user such that the user's thumbs are positioned to operate controls located on the top of the controller and the user's index fingers are positioned to operate controls located on the front of the controller;
wherein at least one control located on the top of the controller is configured for two-dimensional input control, the at least one control being substantially aligned with the biomechanics of the user's thumb.

Optionally, said at least one control is adjustable to a desired alignment.

In some embodiments, said at least one control is securable in a given position by frictional engagement between a first surface and a second surface.

Alternatively, said at least one control is securable in a given position by interpositional engagement of at least one projection provided on a first surface within at least one recess provided on a second surface.

Optionally, said at least one control is adjustable in predefined increments.

In some embodiments, said at least one control is adjustable by physically rotating the orientation of the at least one control with respect to the outer case.

Alternatively, said at least one control is adjustable by calibrating the orientation of the at least one control with a computer program.

According to a second aspect of the present invention there is provided a hand held controller for a games console comprising:
an outer case; and
a plurality of controls located on a front end and top of the controller;
the controller being shaped to be held in both hands of a user such that the user's thumbs are positioned to operate controls located on the top of the controller and the user's index fingers are positioned to operate controls located on the front of the controller;
wherein at least one control located on the top of the controller is configured for two-dimensional input control, the orientation of the at least one control with respect to the outer case being adjustable to a desired alignment.

In some embodiments, said at least one control is securable in a given position by frictional engagement between a first surface and a second surface.

Alternatively, said at least one control is securable in a given position by interpositional engagement of at least one projection provided on a first surface within at least one recess provided on a second surface.

Optionally, said at least one control is adjustable in predefined increments.

In some embodiments, said at least one control is adjustable by physically rotating the orientation of the at least one control with respect to the outer case.

Alternatively, said at least one control is adjustable by calibrating the orientation of the at least one control with a computer program.

According to a third aspect of the present invention there is provided a hand held controller for a games console comprising:
an outer case; and
a plurality of controls located on a front end and top of the controller;
the controller being shaped to be held in both hands of a user such that the user's thumbs are positioned to operate controls located on the top of the controller and the user's index fingers are positioned to operate controls located on the front of the controller;

wherein at least one control located on the top of the controller is configured for two-dimensional directional control, the orientation of the directional control being adjustable to a desired orientation with respect to the front of the controller.

In some embodiments, said at least one control is securable in a given position by frictional engagement between a first surface and a second surface.

Alternatively, at least one control is securable in a given position by interpositional engagement of at least one projection provided on a first surface within at least one recess provided on a second surface.

Optionally, said at least one control is adjustable in predefined increments.

In some embodiments, said at least one control is adjustable by physically rotating the orientation of the at least one control with respect to the outer case.

Alternatively, said at least one control is adjustable by calibrating the orientation of the at least one control with a computer program.

According to a fourth aspect of the present invention there is provided an apparatus for a controller for a games console comprising:

a two dimensional control device mounted to a first plate wherein the plate is rotationally mounted upon a printed circuit board.

Preferably, the first plate comprises a plurality of first electrical contacts comprising concentric rings or arcs of electrically conductive material.

In some embodiments, the printed circuit board comprises a plurality of second electrical contacts configured to engage with a respective one of the first electrical contacts.

Optionally, each of the plurality of second electrical contacts is resiliently biased against a respective one of the first electrical contacts.

In some embodiments, the two dimensional control device comprises an analogue stick.

In some embodiments, a second plate is mounted onto the printed circuit board between the first plate and the printed circuit board, the first plate being rotatable with respect to the second plate and wherein the second plate comprises a plurality of second electrical contacts configured to engage with a respective one of the first electrical contacts.

According to a fifth aspect of the present invention there is provided a method of configuring a hand held games console;

providing a controller having:
an outer case; and
a plurality of controls located on a front end and top of the controller;
the controller being shaped to be held in both hands of a user such that the user's thumbs are positioned to operate controls located on the top of the controller and the user's index fingers are positioned to operate controls located on the front of the controller;
wherein at least one control located on the top of the controller is configured for two-dimensional directional control, the orientation of the directional control being adjustable to a desired orientation with respect to the front of the controller;
rotating the orientation of the at least one control with respect to the front of the controller to a desired orientation;
securing the at least one control in the desired orientation.

According to a sixth aspect of the present invention there is provided a method of configuring a hand held games console;

providing a controller having:
an outer case; and
a plurality of controls located on a front end and top of the controller;
the controller being shaped to be held in both hands of a user such that the user's thumbs are positioned to operate controls located on the top of the controller and the user's index fingers are positioned to operate controls located on the front of the controller;
wherein at least one control located on the top of the controller is configured for two-dimensional directional control, the orientation of the directional control being adjustable to a desired orientation with respect to the front of the controller;
calibrating the orientation of the at least one control with respect to the front of the controller to a desired orientation;
recording the calibration of the at least one control in a memory device.

Further features and advantages of the present invention will be apparent from the specific embodiments illustrated in the drawings and discussed below.

Within the scope of this application it is envisaged and intended that the various aspects, embodiments, examples, features and alternatives set out in the preceding paragraphs, in the claims and/or in the following description and drawings may be taken independently or in any combination thereof. For example, features described in connection with one embodiment are applicable to all embodiments unless there is incompatibility of features.

BRIEF DESCRIPTION OF THE DRAWINGS

Exemplary embodiments of the invention will now be described with reference to the accompanying drawings, in which.

DETAILED DESCRIPTION

Detailed descriptions of specific embodiments of the games controller and its actuator mechanisms are disclosed herein. It will be understood that the disclosed embodiments are merely examples of the way in which certain aspects of the invention can be implemented and do not represent an exhaustive list of all of the ways the invention may be embodied. Indeed, it will be understood that the games controller and its actuator mechanisms described herein may be embodied in various and alternative forms. The Figures are not necessarily to scale and some features may be exaggerated or minimised to show details of particular components. Well-known components, materials or methods are not necessarily described in great detail in order to avoid obscuring the present disclosure. Any specific structural and functional details disclosed herein are not to be interpreted as limiting, but merely as a basis for the claims and as a representative basis for teaching one skilled in the art to variously employ the invention.

Figure 2:
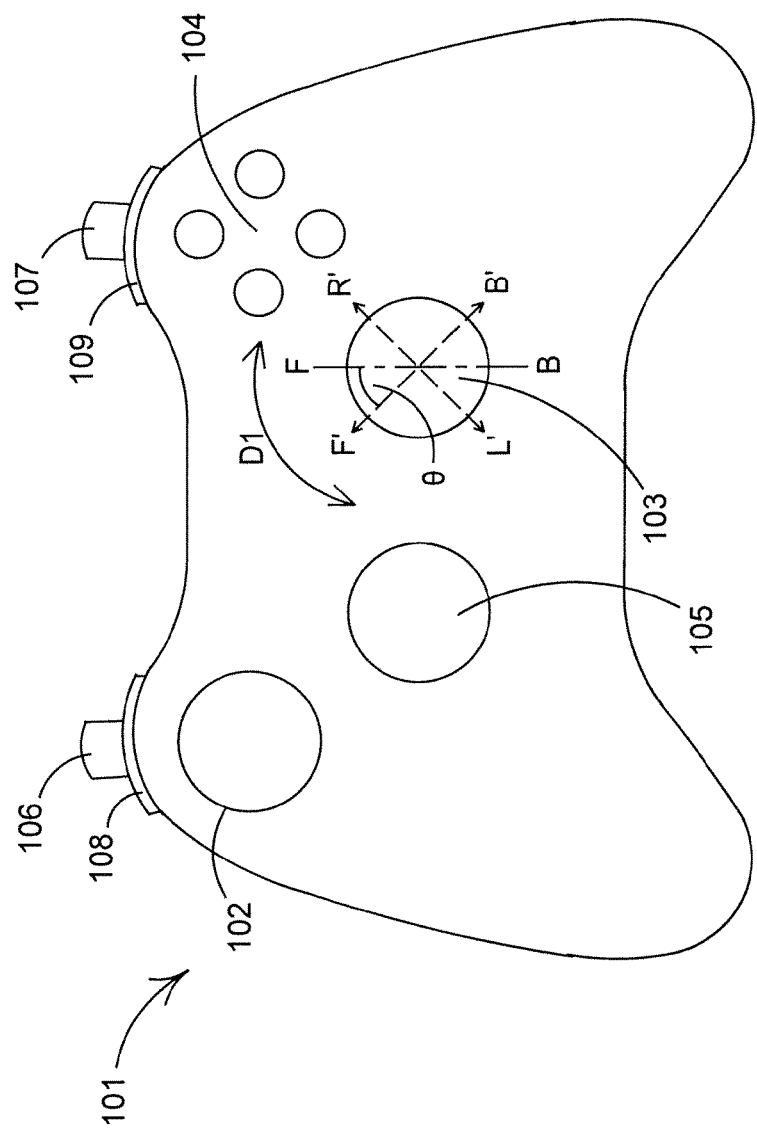
FIG. 2 is a schematic illustration of the front of a conventional games console controller according to an embodiment of the invention.

Referring to FIG. 2 there is shown a controller 101 according to an embodiment of the invention.

The controller 101 comprises controls that are mounted on the front and top of the controller 101. The controller 101 comprises a left analogue thumb stick 102 and a right analogue thumb stick 103. The left analogue thumb stick 102 and the right analogue thumb stick 103 normally control movement actions and are intended to be operated by the user's left and right thumbs respectively. The controller 101 comprises four buttons 104, located on a front-right portion of the controller 101, which normally control additional actions and are intended to be operated by the user's right thumb. The controller 101 comprises a direction pad 105 located on the lower portion of the front-left of the controller 101. The direction pad 105 is intended to be operated by the user's left thumb, typically either as an alternative to the left thumb stick 102 or to provide additional actions. The controller 101 also comprises a left trigger 106, a right trigger 107, a left bumper 108 and a right bumper 109 located on the front edge of the controller 101. The left and right triggers 106, 107 are typically operated by a user's index or fore fingers. The left and right bumpers 108, 109 may also be operated by a user's index or fore fingers.

The thumb sticks 102, 103 and the direction pad 105 each comprise directionality; that is to say, the controller 101 is capable of determining or sensing the direction in which the thumb sticks 102, 103 or direction pad 105 are moved or pressed by a user.

The right thumb stick 103 is configured such that a forward movement action is achieved by moving the right thumb stick 103 in the direction indicated by direction arrow F' towards the front left corner of the controller 101; backward movement action is achieved by moving the right thumb stick 103 towards the back right corner of the controller 101, as indicated by direction arrow B'; movement action to the right is achieved by moving the right thumb stick 103 towards the front right corner of the controller, as indicated by direction arrow R'; movement action to the left is achieved by moving the right thumb stick 103 towards the back left corner of the controller 101, as indicated by direction arrow L'.

Figure 1:
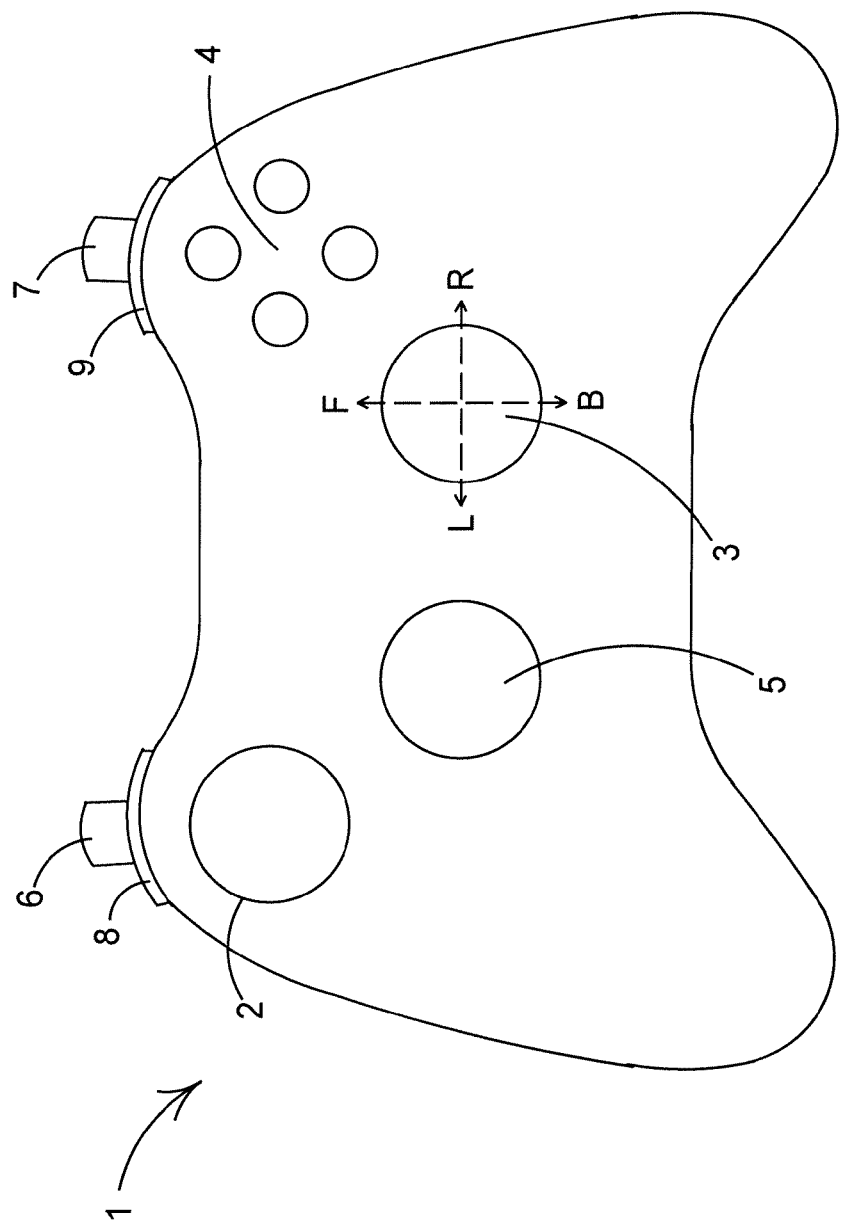
FIG. 1 is a schematic illustration of the front of a conventional games console controller according to the prior art.

The direction of movement for the forwards and backwards movement actions F, B of the controller of FIG. 1 is shown by the dot-dashed line in FIG. 2. It can be seen that the direction of the forward movement action F' is orientated at an angle θ to the forward movement action F of the controller of FIG. 1. The direction of the forward movement action F' has been rotated counter-clockwise with respect to the forward movement action F of the controller of FIG. 1. It will be appreciated that the angle θ will be dependent upon the size, shape and configuration of the controller and upon the size and geometry of the user's hand. In some embodiments it is envisaged that the angle θ will be between 0 and 90 degrees. The direction of the forward movement action F' can be adjusted (as indicated by direction arrow D1) with respect to a front to back direction, indicated by dashed line F-B, of the controller of FIG. 1.

Figure 3:
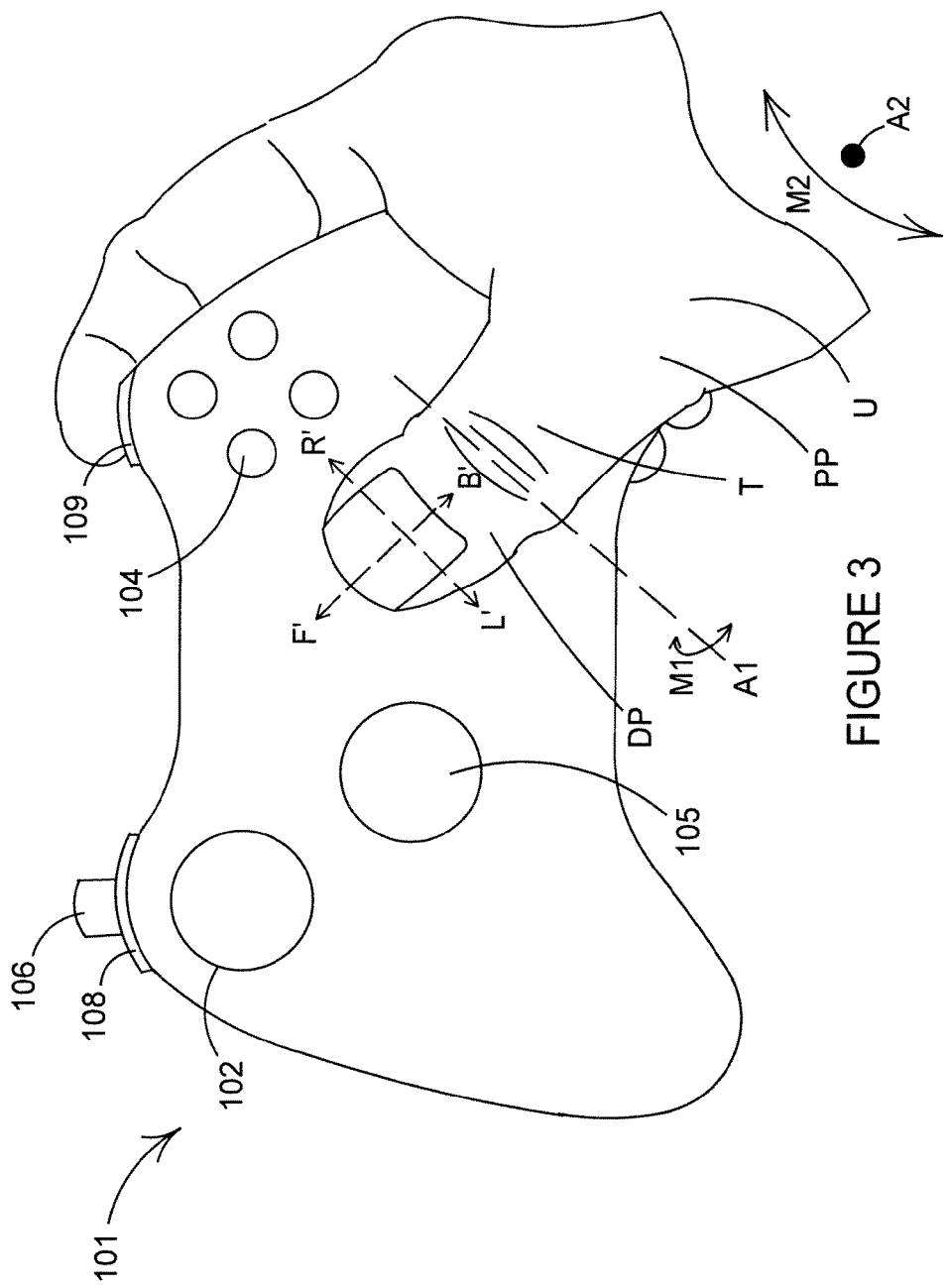
FIG. 3 is a schematic illustration of the front of a conventional games console controller of FIG. 2 showing the use of a directional control by a user.

FIG. 3 shows the controller 101 in the hand of a user U. FIG. 3 shows a thumb T of the user engaging the right thumb stick 103. The user's thumb T is disposed over the right thumb stick 103.

The skeleton of the thumb consists of a first metacarpal bone (not shown) which articulates proximally with the carpus (not shown) at the carpometacarpal joint and distally with the proximal phalanx PP (see FIG. 3) at the metacarpophalangeal joint. The proximal phalanx PP articulates with the distal phalanx DP at the interphalangeal joint.

The distal phalanx DP is pivotally coupled to the proximal phalanx PP by the interphalangeal joint and pivots about an axis indicated by dashed line A1. The distal phalanx DP is moveable in an arc, or pivotable, about the axis A1 as indicated by direction arrow M1. The thumb T is therefore naturally moveable along the line F'-B', the forward and backward movement action, as shown in FIG. 3.

The thumb can be considered to be moveable in an arc M2 about a pivotal axis A2, which axis is disposed at the carpometacarpal joint. The thumb T is therefore naturally moveable along the line R'-L', the right and left movement action, as shown in FIG. 3.

The right thumb stick 103 is configured such that the forward/backward movement actions F', B' and the right/left movement actions R', L' are aligned with the natural movement tendencies of the thumb T. The right thumb stick 103 is configured sympathetically with the biomechanics of the thumb T. The right thumb stick 103 is aligned with the biomechanics of the thumb T.

In embodiments of the invention the left thumb stick 102 is also configured sympathetically with the biomechanics of the thumb T. In such embodiments the forward movement action of the left thumb stick 102 is rotated clockwise with respect to that of the left thumb stick 2 of FIG. 1. Due to the fact that the left thumb stick 102 is mounted closer to the front of the controller 101 than the right thumb stick 103, the left thumb stick 102 is rotated through a smaller angle than the angle through which the right thumb stick is rotated. It will be appreciated that the angle θ will be dependent upon the size, shape and configuration of the controller and upon the size and geometry of the user's hand. In some embodiments it is envisaged that the angle θ will be between 0 and 90 degrees.

In embodiments of the invention the direction pad 105 is also configured sympathetically with the biomechanics of the thumb T.

Figure 4:
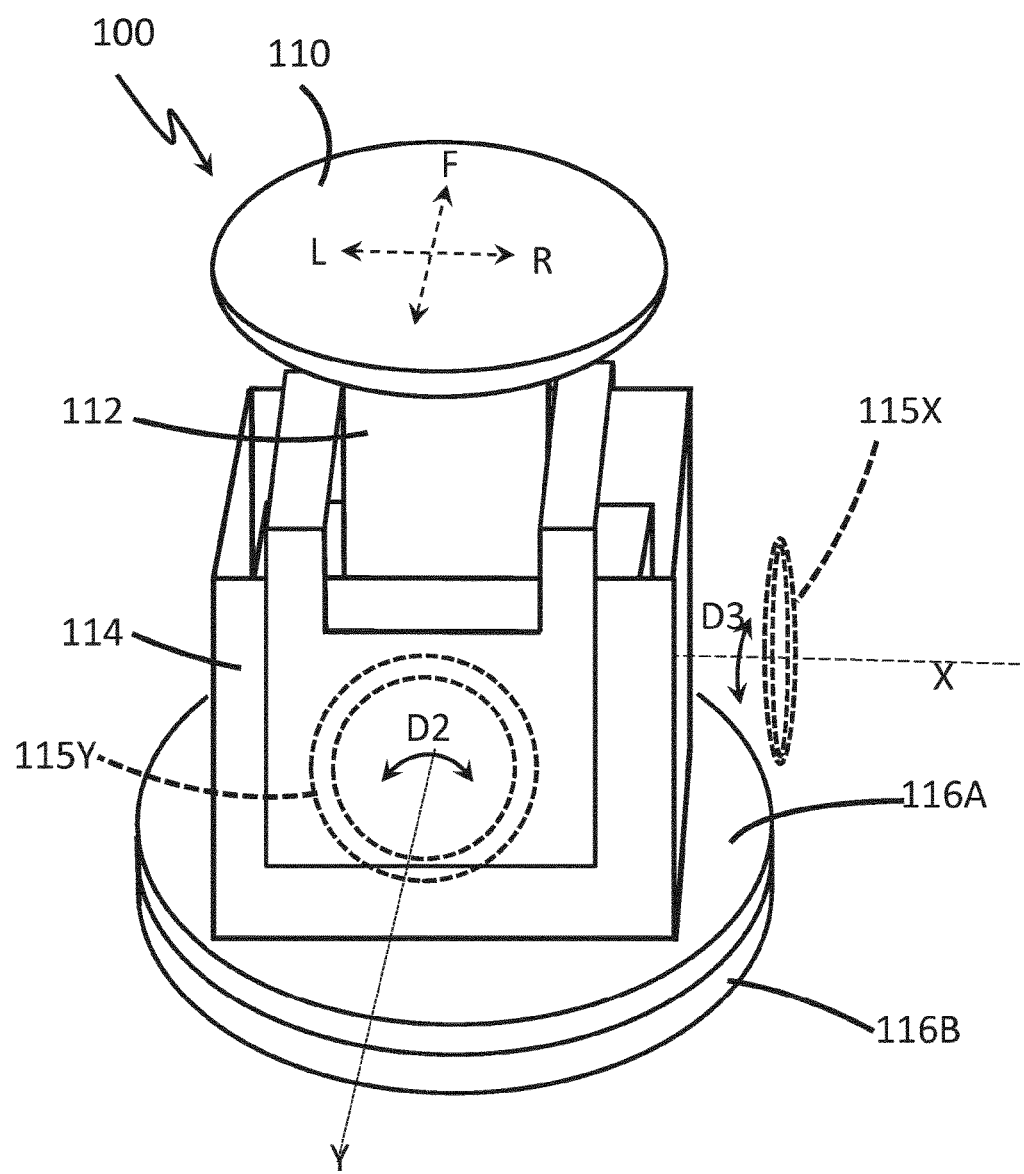
FIG. 4 is a perspective view from above of a directional control component for a games controller according to another embodiment of the invention.
Figure 5:
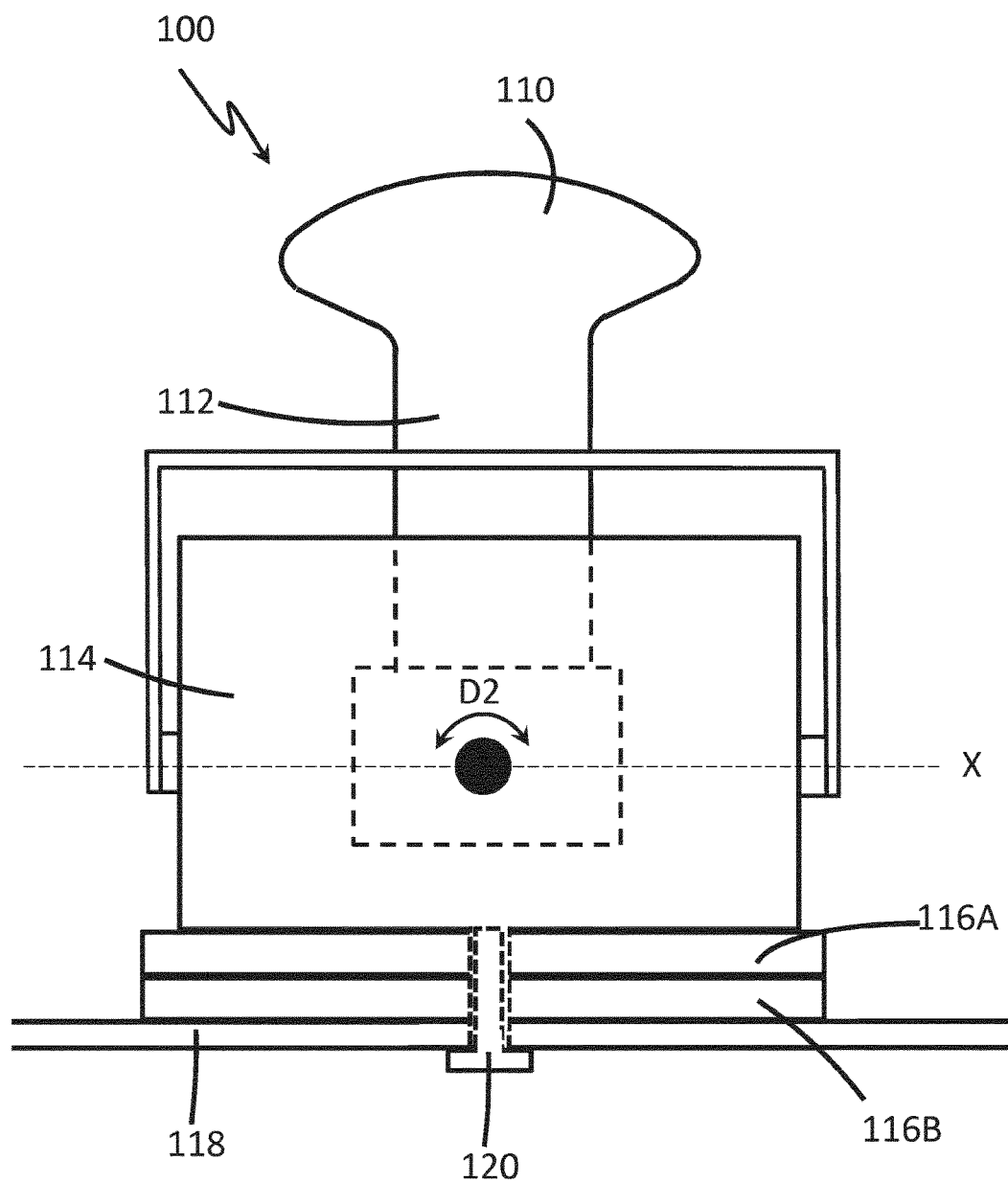
FIG. 5 is a side view of the directional control component shown in FIG. 4.

FIGS. 4 and 5 illustrate a thumb stick control device 100 according to embodiments of the invention. The thumb stick control device 100 may be employed as a right or left thumb stick in a games controller, such as that illustrated in FIGS. 2 and 3. The thumb stick control device 100 comprises an analogue stick, sometimes called a control stick or thumb stick. The analogue stick is an input device that is used for two-dimensional input. The thumb stick control device 100 comprises a head 110 coupled to a shaft 112. The head 110 is substantially dome shaped. In alternative embodiments other shapes are envisaged such as, but not limited to, a concave shape. The shaft 112 is mounted to a body or housing 114. The shaft 112 is mounted to the housing 114 such that it is pivotally moveable about two perpendicular axes x, y simultaneously, as indicated by direction arrows D2, D3 respectively. The shaft 112 is biased to return to a default center position. The input from the analogue stick is based on the position of the shaft 112 in relation to the default center position. The analogue stick comprises two potentiometers 115X, 115Y, variable resistors which are positioned perpendicularly to each other. Electrical current constantly flows through each potentiometer 115X, 115Y; the amount of electrical current flowing through each potentiometer 115X, 115Y is determined by the magnitude of the electrical resistance of that potentiometer 115X, 115Y. The resistance is increased or decreased based on the position of the shaft 112. By monitoring the output of each potentiometer 115X, 115Y, the angle or position at which the shaft 112 is disposed can be determined, and a response appropriate to the angle or position can be initiated.

The analogue stick is mounted to a first plate 116A; the first plate 116A is disposed upon a second plate 116B and is electrically coupled thereto. The first plate 116A is rotationally mounted upon the second plate 116B. The first plate 116A can be locked in a desired orientation with respect to the second plate 116B, for example by a screw or bolt 120, which passes through the second plate 116B into the first plate 116A. In some embodiments the screw or bolt 120 may extend through the first plate 116A into the housing 114. The screw or bolt 120 is tightenable to frictionally engage a first surface provided by the first plate 116A with a second surface provided by the second plate 116B to secure them in position.

The second plate 116B is mounted upon a printed circuit board 118 which carries operative electronic components of the controller 101.

Figure 6:
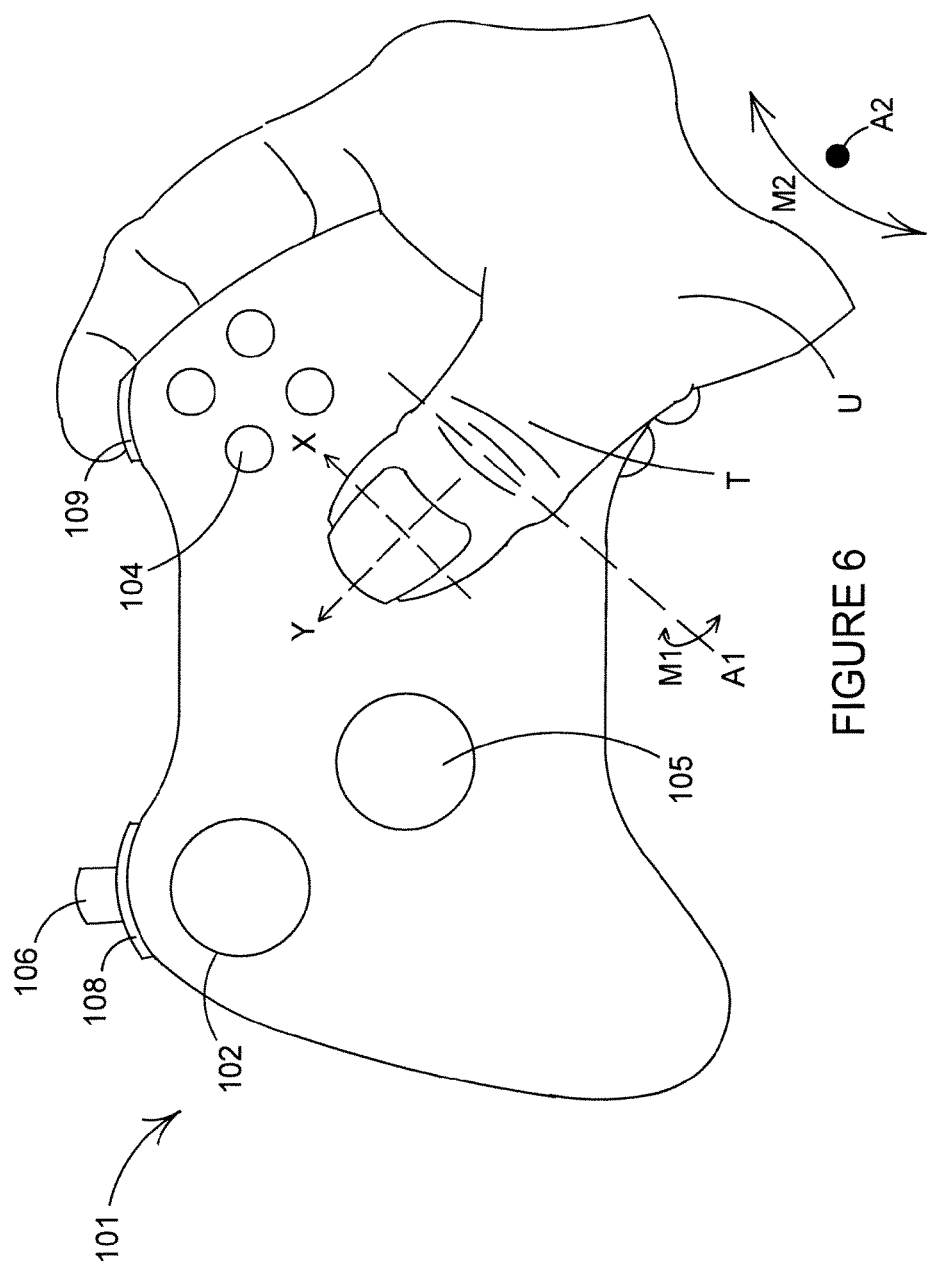
FIG. 6 is a schematic illustration of the front of a conventional games console controller employing the directional control component of FIG. 4 showing the use of a directional control by a user.

FIG. 6 illustrates the thumb stick control device 100 shown in FIGS. 4 and 5 mounted as aright thumb stick 103 in a controller 101. The user's thumb T is shown in relation to the two perpendicular axes x, y about which the shaft 112 is pivotally mounted. The x axis of the analogue stick is aligned substantially parallel to the axis A1 about which the distal phalanx DP of the user's thumb T pivots with respect to the proximal phalanx PP of the user's thumb T. The y axis of the analogue stick is aligned substantially perpendicularly to the axis A1 about which the distal phalanx DP of the user's thumb T pivots with respect to the proximal phalanx PP of the user's thumb T. Hence the user's thumb T naturally moves in an arc M2, which is substantially parallel to the x axis of the analogue stick. In this way the user, when pivotally moving the distal phalanx DP with respect to the proximal phalanx PP, pivots the shaft 112 about the x axis to effect a forwards/backwards control action. The user, when pivotally moving the thumb T about the axis A2 pivots the shaft 112 about the y axis to effect a right/left control action. Thus the user, when moving their thumb T in a simple, natural movement, is only required to effect movement of the analogue stick about a single axis—either the x axis or the y axis. Since the shaft 112 is biased about the x axis, by a first biasing device, and the y axis by a second biasing device, so as to return to the center default position, the user need only work against one of the first and second biasing devices.

Figure 7:
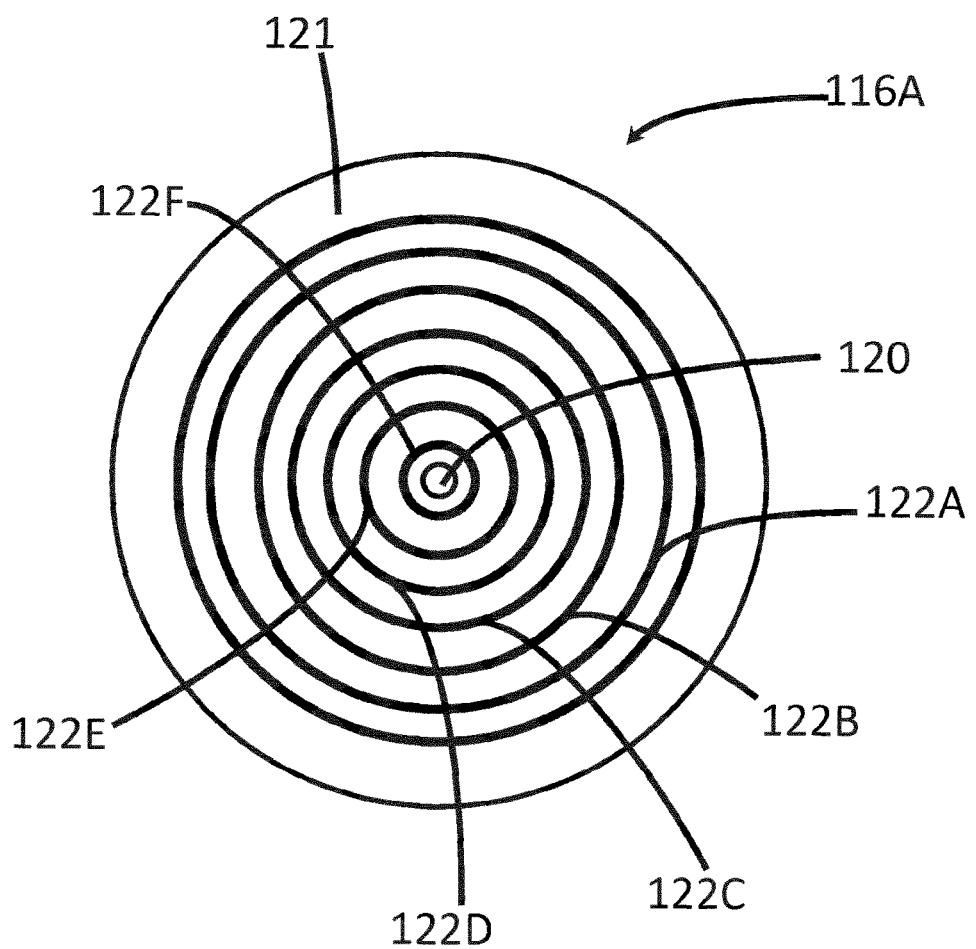
FIG. 7 is a plan view from below of a first element forming the directional control component of FIG. 4.

The first plate 116A is illustrated in FIG. 7. The first plate 116A comprises a body 121 having an aperture 120 through the center for rotationally coupling the first plate 116A to the second plate 116B. The first plate 116A comprises a plurality of first electrical contacts 122A, 122B, 122C, 122D, 122E, 122F formed as concentric rings about the aperture 120.

In alternative embodiments, the angle through which the first plate 116A may rotate with respect to the second plate 116B may be limited to a predefined angle; in such embodiments the first electrical contacts 122A, 122B, 122C, 122D, 122E, 122F need not be closed rings but may be formed as a plurality of concentric arcs. In such embodiments the first plate 116A may comprise an end stop to limit the rotation.

Figure 8:
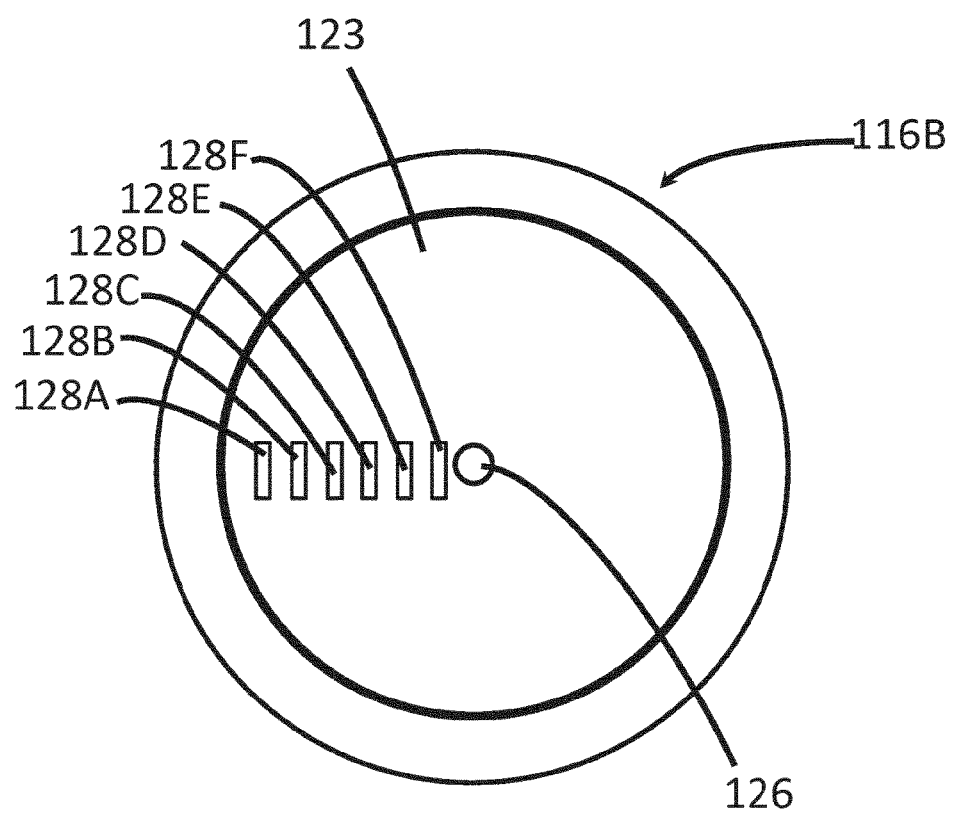
FIG. 8 is a plan view from above of a second element forming the directional control component of FIG. 4.

FIG. 8 illustrates the second plate 116B; the second plate 116B comprises a body 123 having an aperture 126 through the center for rotationally coupling the first plate 116A to the second plate 116B. The second plate 116B comprises a plurality of second electrical contacts 128A, 128B, 128C, 128D, 128E, 128F formed as rectangular contacts. Each of the plurality of second electrical contacts 128A, 128B, 128C, 128D, 128E, 128F is arranged to make electrical contact with a respective one of the first electrical contacts 122A, 122B, 122C, 122D, 122E, 122F. The plurality of second electrical contacts 128A, 128B, 128C, 128D, 128E, 128F and the plurality of first electrical contacts 122A, 122B, 122C, 122D, 122E, 122F are configured such that each of the second electrical contacts 128A, 128B, 128C, 128D, 128E, 128F is in electrical contact with the respective one of the first electrical contacts 122A, 122B, 122C, 122D, 122E, 122F at any given angle of rotation of the first plate 116A with respect to the second plate 116B.

Preferably, the plurality of second electrical contacts 128A, 128B, 128C, 128D, 128E, 128F may be resiliently biased against the respective first electrical contacts 122A, 122B, 122C, 122D, 122E, 122F. For example, each of the plurality of second electrical contacts 128A, 128B, 128C, 128D, 128E, 128F may be formed as a leaf spring from an electrically conductive material.

In alternative embodiments, the plurality of second electrical contacts 128A, 128B, 128C, 128D, 128E, 128F may be formed as a plurality of concentric rings or arcs about the aperture 126 in a similar fashion to the first electrical contacts 122A, 122B, 122C, 122D, 122E, 122F.

In still further embodiments, in particular those in which the angle through which the first plate 116A may rotate with respect to the second plate 116B is limited to a predefined angle, the first electrical contacts 122A, 122B, 122C, 122D, 122E, 122F and second electrical contacts 128A, 128B, 128C, 128D, 128E, 128F may be omitted and the analogue stick may be electrically coupled to a printed circuit board of the controller 101 by a plurality of wires in which sufficient slack is provided to allow the analogue stick to be rotated with respect to the printed circuit board of the controller 101.

Each of the plurality of second electrical contacts 128A, 128B, 128C, 128D, 128E, 128F is electrically coupled to the printed circuit board 118 to control the electronics (not shown) which monitor the position of the shaft 112.

Referring now to FIGS. 9 to 12, there are shown alternative embodiments of the present invention. In the second and third illustrated embodiments like numerals have, where possible, been used to denote like parts, albeit with the replacement of the prefix "100" with the prefix "200" or "300" to indicate that these features belong to the second and third embodiments.

The alternative embodiments share many common features with the first embodiment and therefore only the differences from the embodiment illustrated in FIGS. 2 to 8 will be described in any greater detail.

Figure 9:
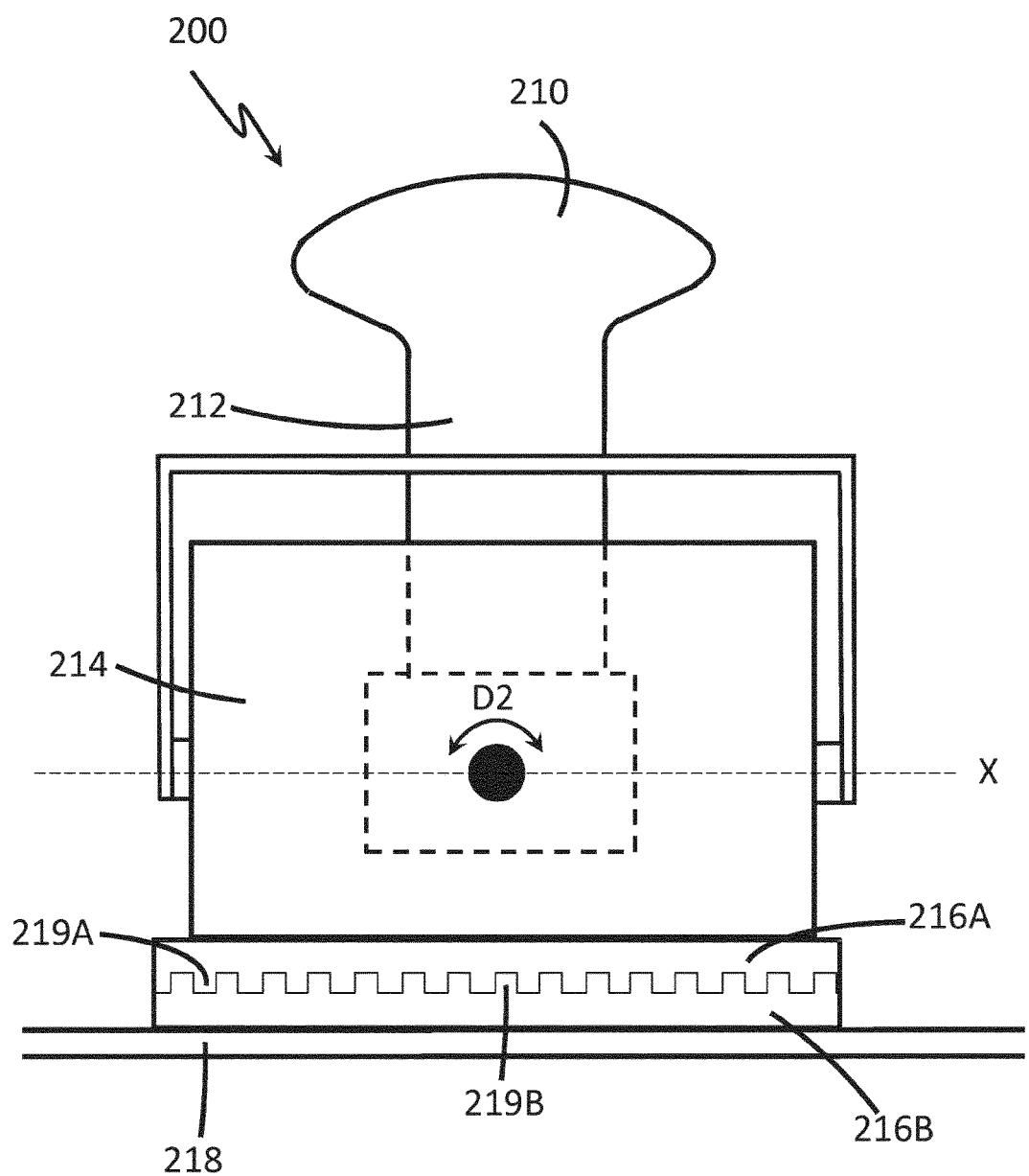
FIG. 9 is a side view of a directional control component for a games controller according to yet another embodiment of the invention.

FIG. 9 illustrates a side view of a thumb stick control device 200 according to a second embodiment. The thumb stick control device 200 comprises a first plate 216A upon which the analogue stick is mounted; the first plate 216A is disposed upon a second plate 216B and is electrically coupled thereto. The first plate 216A is rotationally mounted upon the second plate 216B. The first plate 216A can be locked in a desired orientation with respect to the second plate 216B, for example by a screw or bolt (not shown) which passes through the second plate 216B into the first plate 216A. In some embodiments the screw or bolt or may extend through the first plate 216A into the housing 214. The screw or bolt is tightenable to lock the first plate 216A to the second plate 216B in a desired relative orientation. The first plate 216A comprises a plurality of first teeth 219A interposed by a plurality of recesses or wells. The second plate 216B comprises a plurality of second teeth 219B interposed by a plurality of recesses or wells. The first and second teeth 219A, 219B are configured to mate or mesh with each other. Preferably, the first and second teeth 219A, 219B are each rectangular in shape and comprise pairs of substantially vertical side walls and flat top portions. The plurality of recesses or wells provided on one of the first and second plates 216A, 216B are configured to receive the respective first or second teeth 219A, 219B of the other of the first and second plates 216A, 216B. It will be appreciated that the number of teeth provided upon the first and/or second plates 216A, 216B will determine the accuracy or resolution with which the first plate 216A can be aligned with respect to the controller 101. In one embodiment the first and second plates 216A, 216B each comprise 360 teeth spaced equally about the circumference of the first and second plates 216A, 216B. In this way the user can incrementally adjust the orientation of the first plate 216A with respect to the second plate 216B in increments of 1 degree. The teeth 219A provide projections from the surface of the first plate 216A, whereas the teeth 219B provide projections from the surface of the second plate 216B; the teeth 219A of the first plate 216A are interposed between the teeth 219B of the second plate 216B such that the first and second plates 216A, 216B are in interpositional engagement with each other.

Figure 10:
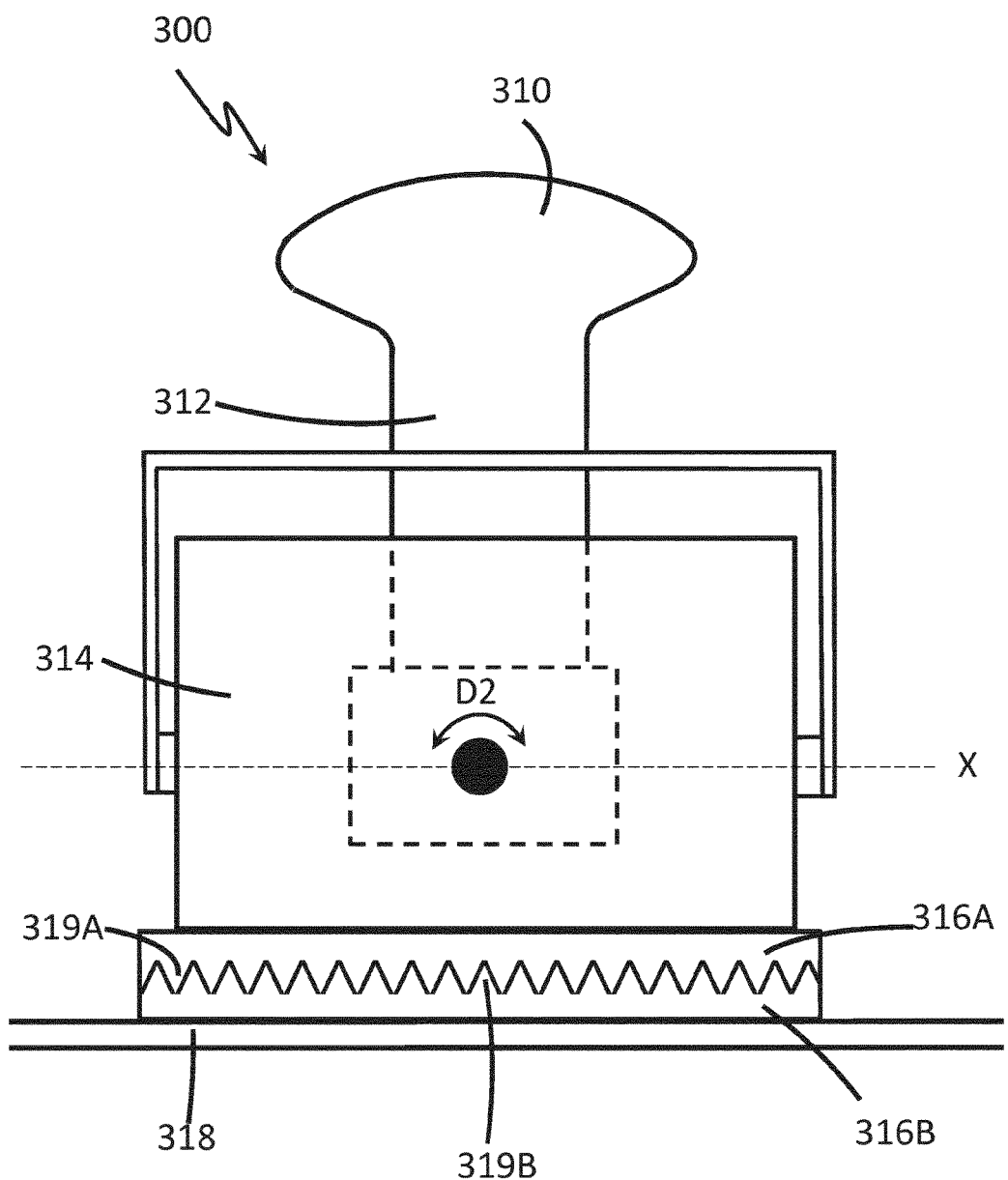
FIG. 10 is a side view of a directional control component for a games controller according to a further embodiment of the invention.
Figure 11:
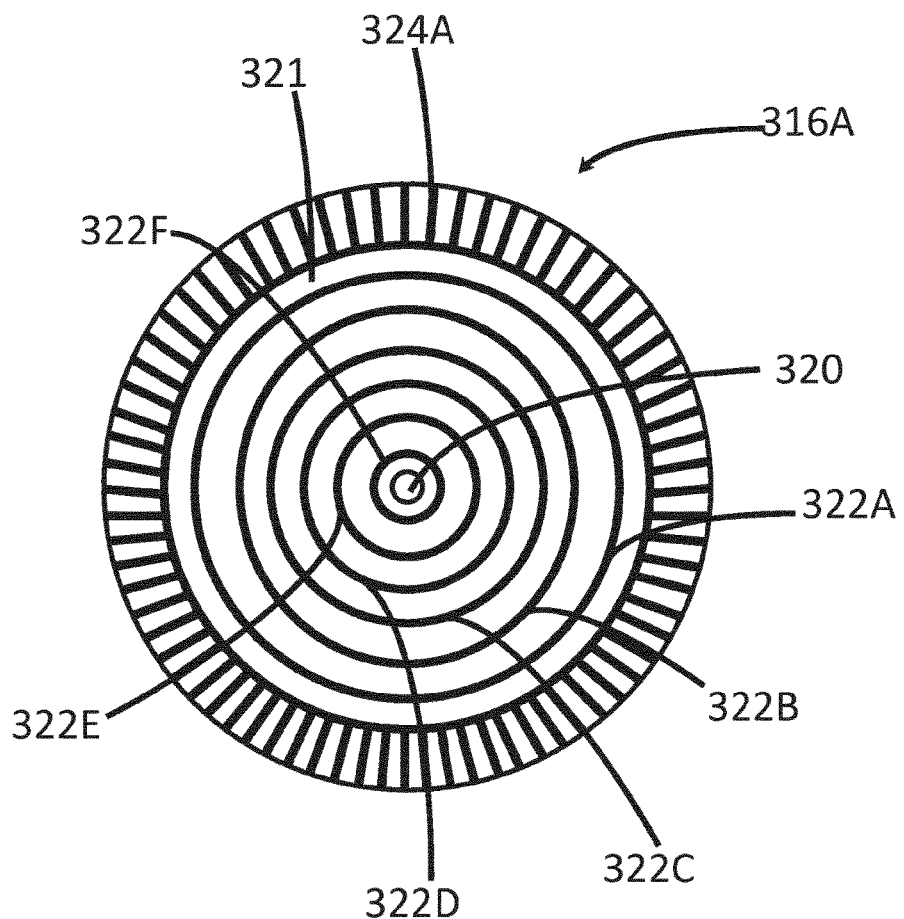
FIG. 11 is a plan view from below of a first element forming the directional control component of FIG. 10.
Figure 12:
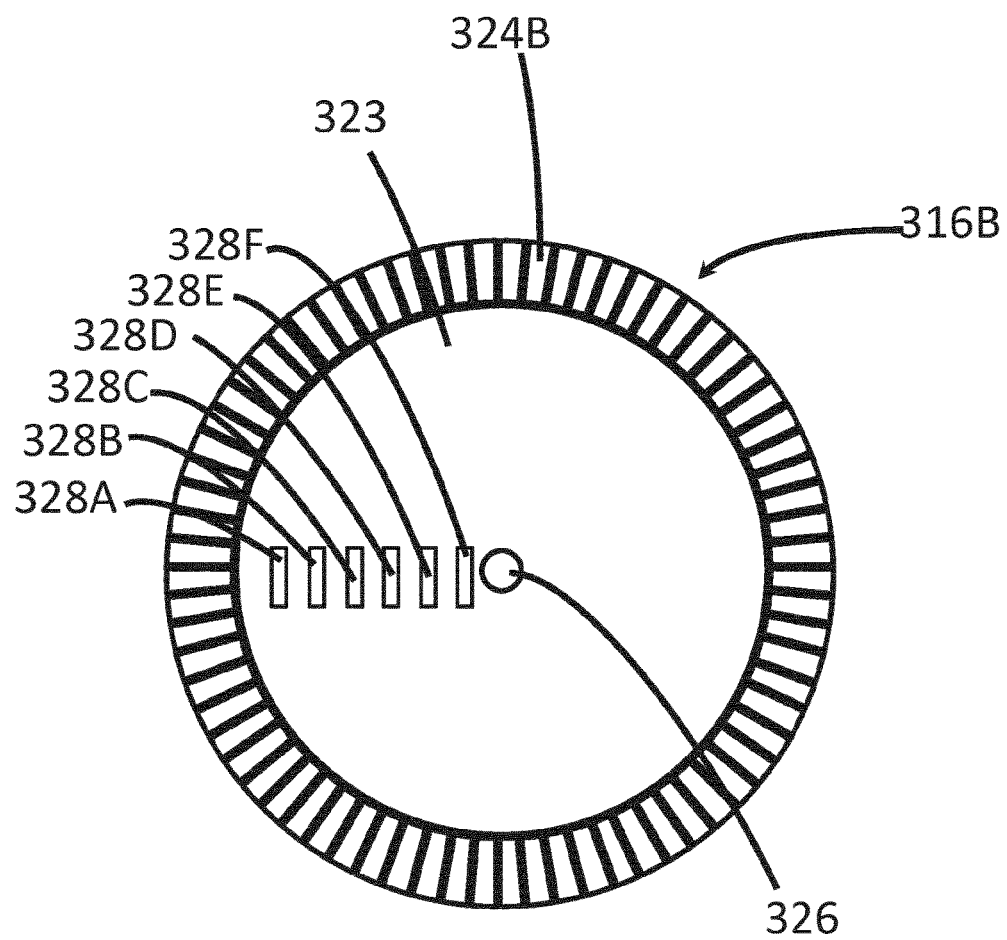
FIG. 12 is a plan view from above of a second element forming the directional control component of FIG. 10.

FIG. 10 illustrates a side view of a thumb stick control device 300 according to a third embodiment. The thumb stick control device 300 comprises a first plate 316A upon which the analogue stick is mounted; the first plate 316A is disposed upon a second plate 316B and is electrically coupled thereto. The first plate 316A is rotationally mounted upon the second plate 316B. The first plate 316A, shown in FIG. 11, can be locked in a desired orientation with respect to the second plate 316B, shown in FIG. 12, for example by a screw or bolt (not shown) which passes through the second plate 316B into the first plate 316A. The screw or bolt may be tightened to lock the first plate 316A to the second plate 316B in a desired relative orientation. The first plate 316A comprises a plurality of first teeth 319A interposed by a plurality of recesses or wells. The plurality of first teeth 319A are arranged in an annular region 324A adjacent to the perimeter of the first plate 316A. The second plate 316B comprises a plurality of second teeth 319B interposed by a plurality of recesses or wells. The plurality of second teeth 319B are arranged in an annular region 324B adjacent to the perimeter of the second plate 316B. The first and second teeth 319A, 319B are configured to mate or mesh with each other. Preferably, the first and second teeth 319A, 319B are triangular in shape. The plurality of recesses or wells provided on one of the first and second plates 316A, 316B are configured to receive the respective first or second teeth 319A, 319B of the other of the first and second plates 316A, 316B.

In other embodiments of the invention the second plate 116B, 216B, 316B may be integrally formed with the printed circuit board 118, 218, 318. In other words, the features of the second plate 116B, 216B, 316B may be provided directly upon the printed circuit board 118, 218, 318.

In yet other embodiments of the present invention it is intended that the user may calibrate the analogue stick in a software application or a computer program executed upon the controller 101 or upon a games console or other device to which the controller 101 is coupled in order to align the left or right thumb sticks 102, 103 to a desired angle. The calibration may be recorded on a memory device disposed in the controller 101 or the games console or other device. The direction pad 105 may be similarly aligned. In this way the directional controls of the analogue stick may be aligned with the biomechanics of the thumb T. In one embodiment the user is requested to manipulate the left or right thumb stick 102, 103 by moving the thumb stick 102, 103 backwards and forwards in a given direction one or more times; for example, the user may pivot or articulate the distal phalanx DP about the interphalangeal joint to define the forward and backward control actions, or the user may pivot the thumb across the arc M2 to define the right and left control actions. It is envisaged that the software application would provide instructions to the user; such instructions may include demonstrations or simulations of the movement of their thumb which they should aim to reproduce in order to biomechanically align the thumb stick with their own thumb. The software application would record the direction of the movements of the user thumb and would calibrate the thumb stick based upon these movements. When several movements have been record the calibration may be based upon an average value; this may be a mean value, median value or mode value. In some embodiments the average value may be calculated as a linear regression or best fit, or an average of several linear best fits, based upon recorded data.

It is envisaged that the controllers may be coupled to a games console or computer by a wired connection or by a wireless connection device.

It will be recognized that as used herein, directional references such as "top", "bottom", "front", "back", "end", "side", "inner", "outer", "upper" and "lower" do not limit the respective features to such orientation, but merely serve to distinguish these features from one another.

The invention claimed is:

1. A hand held controller for a games console comprising:
an outer case; and
a plurality of controls located on a front end and top of the controller, the plurality of controls including at least one analogue thumbstick;
the controller being shaped to be held in both hands of a user such that the user's thumbs are positioned to operate controls located on the top of the controller and the user's index fingers are positioned to operate controls located on the front end of the controller;
wherein the analogue thumbstick is located on the top of the controller and comprises a shaft pivotally mounted about two perpendicular axes, wherein the analogue thumbstick is configured for two-dimensional input control, and wherein the analogue thumbstick is substantially aligned with the biomechanics of the user's thumb such that control movement in a first direction is effected by the user's movement about the interphalangeal joint such that the shaft pivots about a first of the two axes and control movement in a second direction is effected by the user's natural movement about the carpometacarpal joint such that the shaft pivots about a second of the two axes.

2. The controller of claim 1 wherein said at least one control is adjustable to a desired alignment.

3. The controller of claim 2 wherein said at least one control is securable in a given position by frictional engagement between a first surface and a second surface.

4. The controller of claim 2 wherein said at least one control is securable in a given position by interpositional engagement of at least one projection provided on a first surface within at least one recess provided on a second surface.

5. The controller of claim 2 wherein said at least one control is adjustable in predefined increments.

6. The controller of claim 2 wherein said at least one control is adjustable by physically rotating the orientation of the at least one control with respect to the outer case.

7. The controller of claim 2 wherein said at least one control is adjustable by calibrating the orientation of the at least one control with a computer program.

8. A hand held controller for a games console comprising:
   an outer case; and
   a plurality of controls located on a front end and top of the controller, the plurality of controls including at least one analogue thumbstick;
   the controller being shaped to be held in both hands of a user such that the user's thumbs are positioned to operate controls located on the top of the controller and the user's index fingers are positioned to operate controls located on the front end of the controller;
   wherein the analogue thumbstick is located on the top of the controller and comprises a shaft pivotally mounted about two perpendicular axes, wherein the analogue thumbstick is configured for two-dimensional input control, and wherein the orientation of the analogue thumbstick with respect to the outer case is adjustable to a desired alignment.

9. The controller of claim 8 wherein said at least one control is securable in a given position by frictional engagement between a first surface and a second surface.

10. The controller of claim 8 wherein said at least one control is securable in a given position by interpositional engagement of at least one projection provided on a first surface within at least one recess provided on a second surface.

11. The controller of claim 8 wherein said at least one control is adjustable in predefined increments.

12. The controller of claim 8 wherein said at least one control is adjustable by physically rotating the orientation of the at least one control with respect to the outer case.

13. The controller of claim 8 wherein said at least one control is adjustable by calibrating the orientation of the at least one control with a computer program.

14. A hand held controller for a games console comprising:
   an outer case; and
   a plurality of controls located on a front end and top of the controller, the plurality of controls including at least one analogue thumbstick;
   the controller being shaped to be held in both hands of a user such that the user's thumbs are positioned to operate controls located on the top of the controller and the user's index fingers are positioned to operate controls located on the front end of the controller;
   wherein the analogue thumbstick is located on the top of the controller and comprises a shaft pivotally mounted about two perpendicular axes, wherein the analogue thumbstick is configured for two-dimensional input control, and wherein the orientation of the analogue thumbstick is adjustable to a desired orientation with respect to the front end of the controller.

15. The controller of claim 14 wherein said at least one control is securable in a given position by frictional engagement between a first surface and a second surface.

16. The controller of claim 14 wherein said at least one control is securable in a given position by interpositional engagement of at least one projection provided on a first surface within at least one recess provided on a second surface.

17. The controller of claim 14 wherein said at least one control is adjustable in predefined increments.

18. The controller of claim 14 wherein said at least one control is adjustable by physically rotating the orientation of the at least one control with respect to the outer case.

19. The controller of claim 14 wherein said at least one control is adjustable by calibrating the orientation of the at least one control with a computer program.

20. An apparatus for a controller for a games console comprising:
   a two dimensional control device mounted to a first plate wherein the first plate is rotationally mounted upon a printed circuit board, wherein the first plate comprises a plurality of first electrical contacts; and
   a second plate mounted onto the printed circuit board between the first plate and the printed circuit board, the first plate being rotatable with respect to the second plate and wherein the second plate comprises a plurality of second electrical contacts configured to engage with a respective one of the first electrical contacts.

21. The apparatus of claim 20 wherein each of the plurality of second electrical contacts is resiliently biased against a respective one of the first electrical contacts.

22. The apparatus of claim 20 wherein the two dimensional control device comprises an analogue stick.

23. A method of configuring a hand held games console comprising:
   providing a controller having:
      an outer case; and
      a plurality of controls located on a front end and top of the controller, the plurality of controls including at least one analogue thumbstick;
      the controller being shaped to be held in both hands of a user such that the user's thumbs are positioned to operate controls located on the top of the controller and the user's index fingers are positioned to operate controls located on the front end of the controller;
      wherein the analogue thumbstick is located on the top of the controller and comprises a shaft pivotally mounted about two perpendicular axes, wherein the analogue thumbstick is configured for two-dimensional input control, and wherein the orientation of the analogue thumbstick is adjustable to a desired orientation with respect to the front end of the controller;

rotating the orientation of the analogue thumbstick with respect to the front end of the controller to a desired orientation;

securing the analogue thumbstick in the desired orientation.

24. A method of configuring a hand held games console comprising:

providing a controller having:

an outer case; and a plurality of controls located on a front end and top of the controller, the plurality of controls including at least one analogue thumbstick;

the controller being shaped to be held in both hands of a user such that the user's thumbs are positioned to operate controls located on the top of the controller and the user's index fingers are positioned to operate controls located on the front end of the controller;

wherein the analogue thumbstick is located on the top of the controller and comprises a shaft pivotally mounted about two perpendicular axes, wherein the analogue thumbstick is configured for two-dimensional input control, and wherein the orientation of the analogue thumbstick is adjustable to a desired orientation with respect to the front end of the controller;

calibrating the orientation of the analogue thumbstick with respect to the front end of the controller to a desired orientation;

recording the calibration of the analogue thumbstick in a memory device.

* * * * *